United States Patent
Kusudou et al.

(10) Patent No.: US 6,737,013 B1
(45) Date of Patent: *May 18, 2004

(54) CERAMIC-MOLDING BINDER

(75) Inventors: Takeshi Kusudou, Okayama (JP); Toshiyuki Akasawa, Niigata (JP)

(73) Assignee: Kuraray Co., Ltd, Kurashiki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/703,718

(22) Filed: Nov. 2, 2000

(30) Foreign Application Priority Data

Nov. 11, 1999 (JP) .............................. 11-320936
Jun. 6, 2000 (JP) ........................... 2000-169122

(51) Int. Cl.$^7$ .................. C04B 35/634; C08F 8/12; C08F 8/16
(52) U.S. Cl. .................. 264/670; 524/406; 524/408; 524/413; 524/430; 524/431; 524/432; 524/433; 524/435; 524/436; 525/57; 525/60; 525/61; 525/557
(58) Field of Search ................ 525/60, 61, 557, 525/57; 264/670; 524/413, 406, 430, 431, 432, 433, 408

(56) References Cited

U.S. PATENT DOCUMENTS

| | | | |
|---|---|---|---|
| 4,492,783 A | | 1/1985 | Tanaka et al. |
| 4,496,506 A | * | 1/1985 | Sakato et al. ............ 264/670 |
| 5,034,451 A | | 7/1991 | Tanaka et al. |
| 5,171,784 A | | 12/1992 | Colon et al. |
| 5,349,023 A | * | 9/1994 | Ikeda et al. ............... 525/61 |
| 5,712,334 A | * | 1/1998 | Watanabe et al. .......... 525/60 |
| 5,750,313 A | | 5/1998 | Tamada et al. |
| 5,883,209 A | | 3/1999 | Nakano et al. |

FOREIGN PATENT DOCUMENTS

| | | |
|---|---|---|
| EP | 0 704 470 | 4/1996 |
| EP | 1 008 605 | 6/2000 |
| JP | 59-128265 | 7/1984 |
| JP | 62-70254 | 3/1987 |
| JP | 62-70255 | 3/1987 |
| JP | 9-136916 | 5/1997 |
| WO | WO 99/24158 | 5/1999 |

OTHER PUBLICATIONS

Abstract of JP405163062A, Jun. 1993.*
Patent Abstracts of Japan, JP 54 085288, Jul. 6, 1979.

* cited by examiner

Primary Examiner—James Derrington
(74) Attorney, Agent, or Firm—Oblon, Spivak, McClelland, Maier & Neustadt, P.C.

(57) ABSTRACT

A ceramic-molding binder includes a vinyl alcohol polymer having an ethylene unit content of 2 to 19 mole %, a polymerization degree of 200 to 2,000, a degree of saponification of 80 to 99.99 mole %, and a carboxylic acid and lactone ring content of 0.02 to 0.4 mole %. The use of the ceramic-molding binder provides green moldings with better formability and handling properties during the formation of smaller green moldings of more complex shape, and also provides ceramic products of good quality, higher yields, and fewer ceramic cracks when obtained by sintering such green moldings.

10 Claims, 1 Drawing Sheet

CERAMIC-MOLDING BINDER

BACKGROUND OF THE INVENTION

1. Field of the Invention

The present invention relates to a ceramic-molding binder, especially a compression-molding binder for ceramics, a ceramic-molding composition, and a method for producing a ceramic molding.

2. Description of the Related Art

The properties of ceramics have recently been exploited for use in a broad range of applications such as electronic materials, magnetic materials, optical materials, and refractory materials. Improvements in terms of physical properties, formability, and the like have been demanded in such varying applications. For example, more compact and homogenous products are desired for the sake of better thermal, electrical, mechanical properties and the like. In the fields of mechanical parts, electrical parts, and the like, there is also a need for products with more complex shapes and greater sizes. Meanwhile, the recent miniaturization of electrical products in particular has led to increasing demand for smaller components with more complex shapes than in the past. There has been much research in the areas of ceramic powder starting materials and molding methods to meet such demand.

The use of powders with a fine particle diameter and methods for improving the purity of ceramic powders have been proposed in the past as methods for improving the thermal, electrical, mechanical, and optical properties of final ceramic molded products. In terms of molding, the use of such methods can result in a greater particle surface area and lower plasticity because of impurities in the starting material, and greater amounts of an organic binder are also required.

When forming more complex products of greater size, there is a need for higher strength during the processing or handling of green moldings, which are unsintered moldings. The greater complexity and-smaller size of recent products has also lead to demand for green moldings with greater formability and strength than before. Problems occurring during the handling of green moldings or the formation of smaller moldings with more complex shapes include A) greater molding difficulties and defects in portions of green moldings, B) greater difficulty handling green moldings which are far more brittle, and C) cracks in ceramic moldings after the green moldings have been sintered.

The amount of organic binder that is added has conventionally been increased to deal with such problems. However, increasing the amount of organic binder that is added leads to the following problems with ceramic powder starting materials.

1) Problems Removing the Binder

The binder must be removed before the green moldings are sintered, but the increase in exothermic heat and the amount of decomposing gases at such times due to the large amount of organic binder can result in the danger of cracks caused by explosions or the like, and require a longer time to remove the binder.

2) Problems with Contamination by Impurities, etc.

The addition of greater amounts of organic binder can lead to greater contamination by impurities and more carbon residue after the green molding is sintered, resulting in a final product with lower purity.

3) Problems with Dimensional Precision

Increases in the amount of organic binder also lead to greater shrinkage when green moldings are sintered, and a subsequent loss of dimensional precision.

Although a variety of binders have been studied to resolve such problems, there are very few binders which give moldings with higher strength, density, and homogeneity when added in lower amounts. Conventionally known examples include vinyl alcohol polymers with specific hydrophobic groups and hydrophilic groups (sometimes abbreviated as PVA polymers) (such as in Japanese Examined Patent Application (Kokoku) 63-44709 (Japanese Unexamined Patent Application (Kokai) 59-128265, with family members U.S. Pat. No. 4,492,783 and EP 0116300)), and vinyl alcohol polymers having specific monomer units (such as in Japanese Examined Patent Application (Kokoku) 6-6504 (Japanese Unexamined Patent Application (Kokai) 62-70254, with family members U.S. Pat No. 5,034,451 and EP 0220491), and Japanese Unexamined Patent Application (Kokai) 9-136916). These known binders can be successfully used in small amounts, have good miscibility, and are better than conventional binders in terms of performance such as strength, but cannot be considered to provide satisfactory, performance when forming smaller products of more complex shape, particularly by compression-molding.

SUMMARY OF THE INVENTION

An object of the present invention is to provide a ceramic-molding binder which can be added in lower amounts to starting material powder so as to avoid the aforementioned problems 1) through 3), which in particular affords better green molding formability during the molding of smaller products, and which furthermore affords better yields of ceramic moldings, for example, without any of the aforementioned problems A), B), and C), as well as to provide a ceramic-molding composition and a method for producing a ceramic molding.

As a result of extensive research for achieving the aforementioned objectives, the inventors perfected the present invention upon finding that the use, even in lower amounts, of a ceramic-molding binder comprising-mainly a vinyl alcohol polymer having an ethylene unit content of 2 to 19 mole %, a polymerization degree of 200 to 2,000, a degree of saponification of 80 to 99.99 mole %, and a carboxylic acid and lactone ring content of 0.02 to 0.4 mole %, afforded better green formability particularly during the formation of 'smaller products of complex shape in various molding methods, especially compression-molding, that the resulting green molding had better handling properties, and that the subsequently obtained sintered ceramic molding had far fewer cracks, resulting in better yields.

That is, the present invention provides a ceramic-molding binder, comprising a vinyl alcohol polymer having an ethylene unit content of 2 to 19 mole %, a polymerization degree of 200 to 2,000, a degree of saponification of 80 to 99.99 mole %, and a carboxylic acid and lactone ring content of 0.02 to 0.4 mole %.

The present invention also provides a ceramic-molding composition comprising 0.1 to 20 weight parts of the ceramic-molding binder per 100 weight parts ceramic powder.

The present invention furthermore provides a method for producing a ceramic molding, comprising drying an aqueous kneaded mixture of the above ceramic-molding composition to form granules, and molding the granules followed by sintering.

Of binders for various molding processes, the ceramic-molding binder as above is preferably useful as a compression-molding binder for ceramics. Accordingly, the present invention also provides: a compression-molding binder for ceramics, comprising a vinyl alcohol polymer having an ethylene unit content of 2 to 19 mole %, a polymerization degree of 200 to 2,000, a degree of saponification of 80 to 99.99 mole %, and a carboxylic acid and lactone ring content of 0.02 to 0.4 mole %; a ceramic-molding composition comprising 0.1 to 20 weight parts of the compression-molding binder for ceramics per 100 weight parts ceramic powder; and furthermore a method for producing a ceramic molding, comprising drying an aqueous kneaded mixture of the above ceramic-molding composition to form granules, and molding the-granules followed by sintering.

DETAILED DESCRIPTION OF THE INVENTION

Figure 1:
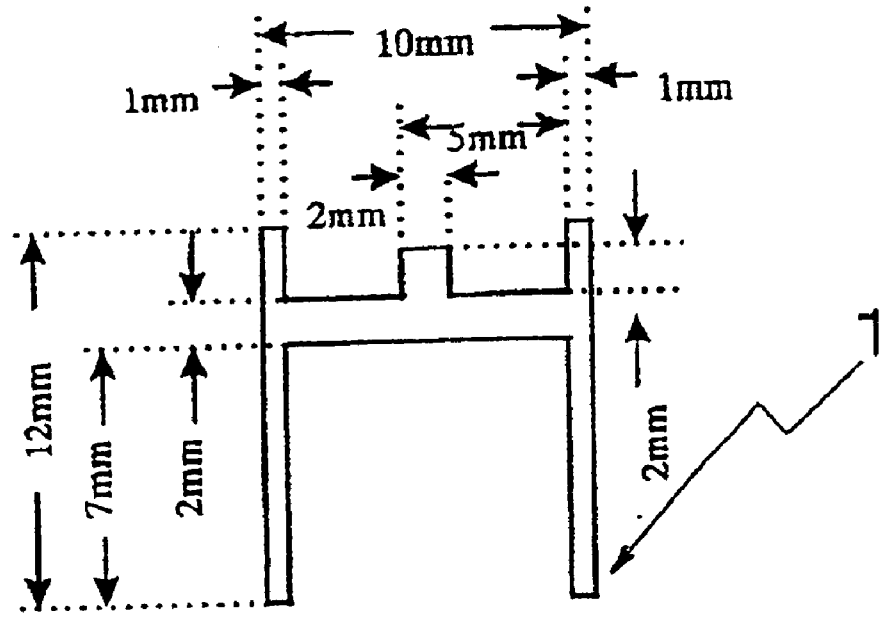
FIG. 1 is a side view illustrating an example of the shape of a green molding.

The PVA polymer used in the present invention has an ethylene unit content of 2 to 19 mole %, a polymerization degree of 200 to 2,000, a degree of saponification of 80 to 99.99 mole %, and a carboxylic acid and lactone ring content of 0.02 to 0.4 mole %.

The PVA polymer in the present invention must have an ethylene unit content of 2 to 19 mole %. The ethylene unit content is preferably 2.5 to 15 mole %, even more preferably 3 to 10 mole %, and ideally 3.5 to 7 mole %. An ethylene unit content of less than 2 mole % will not produce the intended effects of the present invention, whereas an ethylene content of more than 19 mole % will result in a PVA polymer with lower water solubility.

The ethylene content of the PVA polymer in the present invention can be determined on the basis of proton NMR of the ethylene-containing polyvinyl ester, which is the precursor of the PVA polymer. That is, the resulting polyvinyl ester is purified by reprecipitation three or more times in n-hexane/acetone, and is then dried in vacuo for 3 days at 80° C. to produce a polyvinyl ester for analysis. The polyvinyl ester is dissolved in DMSO-d6, and the content is determined at 80° C. using 500 MHz proton NMR (JEOL GX-500). The ethylene content is calculated using the peak originating from the main chain methyne of the polyvinyl ester (4.7 to 5.2 ppm), and peaks originating from the main chain methylene of a third component, vinyl ester, and ethylene (0.8 to 1.6 ppm).

The PVA polymer in the present invention must contain ethylene units, as well as carboxylic acid and lactone rings. When the total content of the carboxylic acid and lactone rings is within a specific range, the performance of the ceramic-molding binder is dramatically improved. The content should range between 0.02 and 0.4 mole %, preferably between 0.022 and 0.37 mole %, even more preferably between 0.024 and 0.33 mole %, and ideally between 0.025 and 0.3 mole %. A carboxylic acid and lactone ring content of less than 0.02 mole % will result in an aqueous solution with lower viscosity stability at lower temperatures, as well as lower viscosity stability and gelling of aqueous solutions of high concentration. A content of more than 0.4 mole % tends to cause the molds to stain during compression-molding.

It has been found that the effects of the present invention are dramatically improved when the total content of the carboxylic acid and lactone rings of the PVA polymer in the present invention satisfies the following Formula I.

$$-1.94 \times 10^{-5} \times P + 0.044 \leq \text{content} \leq -1.39 \times 10^{-4} \times P + 0.42 \quad (I)$$

(where the content (in mole %) represents the content of carboxylic acid and lactone rings, and P represents the viscosity average degree of polymerization-of the vinyl alcohol polymer).

The following methods may be used to introduce the carboxylic acid and lactone rings: (1) methods in which a vinyl ester monomer such as vinyl acetate is copolymerized with a monomer having the capacity for producing carboxylic acids and lactone rings, and the resulting vinyl ester polymer is saponified in an alcohol or dimethyl sulfoxide solvent; (2) methods in which a vinyl ester monomer is polymerized in the presence of a thiol compound containing a carboxylic acid, such as mercaptoacetic acid or 3-mercaptopropionic acid, and the resulting vinyl ester polymer is saponified; (3) methods in which the chain transfer reaction to the alkyl group of a vinyl ester monomer and a vinyl ester polymer is brought about during the polymerization of a vinyl ester monomer such as vinyl acetate, and the resulting highly branched vinyl ester polymer is saponified; (4) methods in which a reaction is brought about between a thiol compound having carboxyl groups and a copolymer of a monomer having epoxy groups and a vinyl ester monomer, and the resulting vinyl ester polymer is saponified; and (5) methods for the acetalization of PVA with an aldehyde having carboxyl groups.

Examples of monomers having the capacity for producing carboxylic acids and lactone rings include fumaric acid, maleic acid, itaconic acid, maleic anhydride, or monomers having carboxyl groups derived from maleic anhydride or the like; (meth)acrylic acid and salts thereof, (meth)acrylate esters such as methyl (meth)acrylate, ethyl (meth)acrylate, n-propyl (meth)acrylate, and i-propyl (meth)acrylate; and (meth)acrylamide and (meth)acrylamide derivatives such as N-methyl (meth)acrylamide and N-ethyl (meth)acrylamide.

The content of the carboxylic acid and lactone rings in the PVA polymer can be determined on the basis of the peaks in proton NMR. The method is described below. After complete saponification to a-degree of saponification of at least 99.95 mole %, the resulting polymer is thoroughly washed with methanol and is then dried in vacuo for 2 days at 90° C. to prepare PVA for analysis. When the carboxylic acid and lactone rings are introduced by method (1) above, the PVA for analysis is dissolved in DMSO-d6, and the content is determined at 60° C. using 500 MHz proton NMR (JEOL GX-500). The content is calculated by the usual method using main chain methyne-derived peaks (2.0 ppm) for acrylic acid, acrylic acid ester, acrylamide, and acrylamide derivative monomer units, and using peaks (0.6 to 1.0 ppm) derived from methyl groups linked to the main chain for methacrylic acid, methacrylic acid ester, methacrylamide, and methacrylamide derivative monomers. Fumaric acid, maleic acid, itaconic acid, maleic anhydride, or monomers having carboxyl groups derived from maleic anhydride or the like are measured at 60° C. using 500 MHz proton NMR (JEOL GX-500) upon the addition of some drops of trifluoroacetic acid after the dissolution of the PVA for analysis in DMSO-d6. The content is calculated by the usual method using the methyne peak of the lactone ring assigned to 4.6 to 5.2 ppm. In the case of (2) and (4) above, the content is calculated using the peak (2.8 ppm) originating from the methylene linked to the sulfur atom. In the case of (3), the PVA for analysis is dissolved in methanol-d4/$D_2O$=2/8, and the content is measured at 80° C. using 500 MHz proton NMR (JEOL GX-500). The peaks (Chemical Structure 1 and 2 below) originating from the methylene of the terminal carboxylic acid or an alkali metal salt thereof are assigned to 2.2 ppm (integrated value A) and 2.3 ppm (integrated value B), the methylene-derived peak (Chemical structure 3 below) of the terminal lactone ring is assigned to 2.6 ppm (integrated value C), the methyne-derived peak of the vinyl alcohol unit is assigned to 3.5 to 4.14 ppm (integrated value D), and the carboxylic acid and lactone ring content is calculated by the following Formula II.

$$\text{carboxylic acid and lactone ring content (mole \%)} = 50 \times (A+B+C) \times (100-\Delta)/(100 \times D) \quad \text{(II)}$$

where Δ represents the ethylene content (mole %).

Chemical Structure 1:
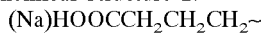
(Na)HOOCCH$_2$CH$_2$CH$_2$~

Chemical Structure 2:
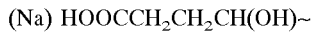
(Na) HOOCCH$_2$CH$_2$CH(OH)~

Chemical Structure 3:

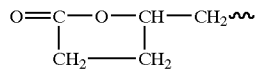

In the case of (5), the PVA for analysis is dissolved in DMSO-d6, and the content is measured at 60° C. using 500 MHz proton NMR (JEOL GX-500). The content is calculated in the usual manner using the peak 4.8 to 5.2 ppm (Chemical Structure 4 below) derived from the methyne of the acetal moiety.

Chemical Structure 4:

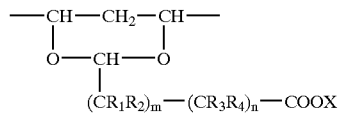

(where R$_1$ through R$_4$ represent hydrogen atoms or C$_1$ to C$_{10}$ alkyl groups; m and n represent an integer of 0 to 10; and X represents a hydrogen atom or sodium atom).

The PVA polymer in the present invention must have a degree of saponification of at least 80 mole %, preferably at least 83 mole %, and more preferably at least 85 mole %. A degree of saponification of less than 80 mole % can result in a PVA with lower water solubility as well as a lower binding strength than the original, and therefore molding strengh becomes lower. The degree of saponification must be no more than 99.99 mole %, and preferably no more than 99.95 mole %.

The viscosity average degree of polymerization (henceforth abbreviated as polymerization degree) of the PVA polymer used in the present invention is preferably between 200 and 2,000, more preferably between 250 and 1950, and even more preferably between 300 and 1900. A polymerization degree of less than 200 may result in a brittle molding, whereas a polymerization degree of more than 2000 may result in a higher aqueous solution viscosity, making it difficult to use the invention as a binder.

Methods for producing the PVA polymer used in the present invention include common methods such as methods for the saponification, in an alcohol or dimethyl sulfoxide solvent, of (i) vinyl ester polymers comprising the copolymerization of ethylene and vinyl ester monomers, and monomers capable of producing carboxylic acids and lactone rings, (ii) vinyl ester polymers comprising the copolymerization of ethylene and vinyl ester monomers in the presence of a thiol compound having carboxylic acids such as mercaptoacetic acid or 3-mercaptopropionic acid; and (iii) highly branched vinyl ester polymers resulting from the chain transfer reaction to the alkyl group of vinyl ester monomers and vinyl ester polymers. Examples of other methods include methods in which a copolymer of ethylene, a vinyl ester monomer and a monomer having epoxy groups are allowed to react with a thiol compound having carboxyl groups, followed by saponification, and methods in which the copolymerization and saponification of ethylene and a vinyl ester monomer are followed by the acetalization of the resulting vinyl alcohol polymer with an aldehyde having carboxyl groups.

Examples of vinyl ester monomers include vinyl formate, vinyl acetate, vinyl propionate, and vinyl pivalate, of which vinyl acetate is preferred.

In the PVA polymer used in the present invention, a copolymerizable ethylenic unsaturated monomer may be copolymerized, provided that the effects of the present invention are not thereby compromised. Examples of such ethylenic unsaturated monomers include acrylamides such as acrylamide, C$_1$ to C$_{18}$ N-alkylacrylamides, N,N-dimethylacrylamide, 2-acrylamidepropanesulfonic acid or salts thereof, acrylamide propyldimethylamine or acid salts thereof or quaternary salts thereof; methacrylamides such as methacrylamide, C$_1$ to C$_{18}$ N-alkylmethacrylamides, N,N-dimethylmethacrylamide, 2-methacrylamidepropanesulfonic acid or salts thereof, methacrylamide propyldimethylamine or acid salts thereof or quaternary salts thereof; N-vinylamides such as N-vinyl pyrrolidone, N-vinyl formamide, and N-vinyl acetamide; vinyl cyanides such as acrylonitrile and methacrylonitrile; vinyl ethers such as C$_1$ to C$_{18}$ alkyl vinyl ethers, hydroxyalkyl vinyl ethers, and alkoxyalkyl vinyl ethers; vinyl halides such as vinyl chloride, vinylidene chloride, vinyl fluoride, vinylidene fluoride, and vinyl bromide; trimethoxyvinylsilane and other such vinylsilanes, allyl acetate, allyl chloride, allyl alcohol, dimethylallyl alcohol, trimethyl-(3-acrylamide-3-dimethylpropyl)-ammonium chloride, and acrylamide-2-methylpropanesulfonic acid.

The method of copolymerization may be a common method such as bulk, solution, suspension, or emulsion polymerization. Of these, solution or bulk polymerization is normally carried out with or without a solvent such as an alcohol. Emulsion polymerization is carried out when a product with a high degree of polymerization is to be obtained. Examples of alcohols which may be used as solvents during solution polymerization include lower alcohols such as methyl alcohol, ethyl alcohol, and propyl alcohol. Examples of initiators which can be used in copolymerization include α,α'-azobisisobutyronitrile, 2,2.'-azobis(2,4-dimethylvaleronitrile), 2,2'-azobis(4-methoxy-2, 4-dimethylvaleronitril-e), benzoyl peroxide, n-propyl peroxycarbonate and other such azo initiators or peroxide initiators. The polymerization temperature is not particularly limited, but is preferably between −30 and 150° C.

The resulting vinyl ester polymer is saponified by a common method. The saponification may, for example, be accomplished while the polymer is dissolved in alcohol or, in some cases, a hydrated alcohol. Examples of alcohols which may be used for saponification include lower alcohols such as methyl alcohol and ethyl alcohol. The use of methyl alcohol is especially preferred. The alcohol used for the saponification may contain no more than 40 wt % of a solvent such as acetone, methyl acetate, ethyl acetate, or benzene. Examples of catalysts which may be used for saponification include alkali catalysts such as hydroxides of alkali metals represented by potassium hydroxide and sodium hydroxide, sodium methylate, and acid catalysts such as mineral acids. The saponification temperature is not particularly limited, but is preferably between 20 and 60° C. When a gelatinous-material is precipitated during the progress of the saponification reaction, the product may be pulverized at that point in time, washed, and then dried to give the target PVA polymer.

Examples of molding methods allowing the properties of the ceramic-molding binder of the present invention to be fully exploited include methods using an aqueous kneaded material in a molding process, such as compression molding, extrusion molding, tape molding, and slush casting. The aqueous kneaded material referred to here comprises a ceramic powder, water, and a binder, to which deflocculants, plasticizers, lubricants, and the like may be added as needed. An organic solvent may also be present as needed, provided that the dissolution of the PVA polymer is not thereby hindered.

Among the aforementioned molding methods, a particularly effective method is compression-molding, where the aqueous kneaded material is dried into granules of a suitable particle diameter, and the granules are then supplied to a suitable mold and molded under pressure.

The amount in which the ceramic-molding binder of the present invention is added will vary depending on the type of ceramic powder, the method of molding, and the shape of the green molding and ceramic molding, but is usually 0.1 to 20 weight parts, and more preferably 0.2 to 15 weight parts, per 100 weight parts ceramic powder.

The ceramic molding can be produced by drying the aqueous kneaded material, molding the resulting granules into a green molding, and then sintering the green molding. The sintering conditions at such times cannot be established as a matter of absolute principle due to differences in the type and shape of the ceramic that is used, the amount of binder that is used, and the like. A ceramic molding may be obtained, for example, by heating the material from room temperature to-between 300 and 500° C. over 2 to 24 hours using an electric furnace or the like, thermally decomposing the organic material such as the binder (binder removal), then heating the material to between 800 and 1500° C. at a rate of 10 to 200° C./min, and then heating the material for another 1 to 24 hours at that temperature.

The PVA polymer in the present invention may be used with deflocculants, lubricants, plasticizers, and the like. Common deflocculants can be used. Deflocculants come in the form of inorganic and organic deflocculants. Examples of inorganic deflocculants include sodium phosphate, caustic soda, and sodium citrate. Examples of organic deflocculants include amines, pyridine, piperidine, polyacrylic acid metal salts or ammonium salts, styrene or isobutene and maleic anhydride copolymer metal salts and ammonium salts, and polyoxyethylene nonylphenol ethers. Commonly used lubricants include natural waxes such as beeswax and vegetable wax, synthetic waxes such as paraffin wax, microcrystalline wax, and low molecular weight polyethylene and its derivatives, fatty acids such as stearic acid and lauric acid, metal salts of fatty acids such as magnesium stearate and calcium stearate, fatty acid amides such as maleic acid imide and stearic acid amide, and polyethylene glycol. These may be in the form of aqueous suspensions. Examples of plasticizers include glycols, polyethylene glycol, glycerin, and triols.

The PVA polymer may also be used with other binders, provided that the effects of the present invention are not thereby compromised. Examples of other binders which can be used for such purposes include various starches and their derivatives, various saccharides and their derivatives, gums, soluble proteins, and cellulose derivatives. Examples of synthetic polymers include PVA, polyvinyl pyrrolidone, polyacrylamide, isobutene-maleic anhydride copolymers, or homopolymers of acrylic acid, methacrylic acid and their esters, or copolymers of two or more of acrylic acid, methacrylic acid and their esters. Examples of aqueous dispersants include olefins such as ethylene, propylene, diolefins such as butadiene and isoprene, vinyl esters such as vinyl, acetate, vinyl ethers ho such as lauryl vinyl ether, and acrylic acid, methacrylic acid and their esters, styrene, and other such monomers, either alone or in combinations of two or more, in the form of polymer aqueous suspensions, etc.

Examples of ceramic powders used in the present invention include metallic or nonmetallic oxide or non-oxide powders which can be used to produce ceramics. The composition of such powders may consist of a single ingredient or compounds, which can be used individually or in the form of mixtures. The constituents of the metal oxides or non-oxides may be cations or anions which may be constituted of single elements or a plurality of elements. Systems containing additives which are added to improve the properties of the oxides and non-oxides can also be used in the present invention. Specific examples include oxides, carbides, nitrides, borides, sulfides, and the like of Li, K, Mg, B, Al, Si, Cu, Ca, Br, Ba, Zn, Cd, Ga, In, lanthanoids, actinoids, Ti, Zr, Hf, Bi, V, Nb, Ta, W, Mn, Fe, Co, Ni and the like. Examples of specific oxide powders containing a plurality of metal elements normally referred to as complex oxides, as classified on the basis of crystal structure, include those having a perovskite structure, such as $NaNbO_3$, $SrZrO_3$, $PbZrO_3$, $SrTiO_3$, $BaZrO_3$, $PbTiO_3$, and $BaTiO_3$; those with a spinel type structure, such as $MgAl_2O_4$, $ZnAl_2O_4$, $CoAl_2O_4$, $NiAl_2O_4$, and $MgFe_2O_4$; those with an illumenite structure, such as $MgTiO_3$, $MnTiO_3$, and $FeTiO_3$; and those with a garnet structure, such as $GdGa_5O_{12}$ and $Y_6Fe_5O_{12}$.

The ceramic-molding binder of the present invention can be-used without being affected by the particle diameter and shape of the aforementioned ceramic powder. However, since the matter of granulation becomes increasingly important as the particle size of the ceramic powder becomes finer, it is more effective to produce a ceramic powder having a mean particle diameter of no more than 20 $\mu$m.

The ceramic-molding binder of the present invention can preferably be used for oxide powders, among the above-mentioned ceramic powders, more preferably metal oxide powders for producing electronic materials, magnetic materials, optical materials, refractory materials and the like, even more preferably ferrite powder.

The ceramic-molding binder of the present invention is suitable for use even with precursors which-can be converted to metal or nonmetal oxides or non-oxides by heat treatment at elevated temperature after being formed into sheets. Examples of precursors include metal or non-metal alcoholates, hydroxide sols obtained by their hydrolysis, silica sols obtained from water glass, etc., as well as basic metal chloride salts, and metal salts of sulfuric acid, nitric acid, formic acid, acetic acid, and the like.

EXAMPLES

The present invention is illustrated in further detail below with reference to examples and-comparative examples, but the present invention is not in any way limited to these examples alone. Parts and percentages in the examples and comparative examples are based on weight, unless otherwise specified.

The details of the polymers used in the following examples and comparative examples are given below.

PVA Polymers A through L

Table 1 gives the content of the vinyl alcohol units, vinyl ester units, ethylene units, and carboxylic acid and lactone units, the degree of saponification, and the polymerization degree of the PVA polymers A through L.

TABLE 1

| Type of PVA polymer | Vinyl alcohol units (mole %) | Vinyl ester units (mole %) | Ethylene units (mole %) | Carboxylic acid and lactone Units (mole %) | Degree of Saponification | Polymerization degree |
|---|---|---|---|---|---|---|
| A | 94.0 | 1.4 | 4.5 | 0.05 | 98.5 | 1550 |
| B | 90.0 | 5.4 | 4.5 | 0.05 | 94.3 | 1550 |
| C | 93.9 | 1.5 | 4.5 | 0.06 | 98.4 | 1320 |
| D | 88.8 | 6.6 | 4.5 | 0.06 | 93.1 | 1320 |
| E | 93.1 | 1.3 | 5.5 | 0.10 | 98.6 | 540 |
| F | 92.0 | 0.7 | 7.0 | 0.30 | 99.2 | 510 |
| G | 84.0 | 11.3 | 4.5 | 0.15 | 88.2 | 1480 |
| H | 95.0 | 1.4 | 3.5 | 0.05 | 98.5 | 1950 |
| I | 91.0 | 1.7 | 7.0 | 0.30 | 98.2 | 330 |
| J | 85.4 | 0.7 | 13.6 | 0.30 | 99.2 | 280 |
| K | 85.3 | 11.3 | 3.0 | 0.35 | 88.3 | 1320 |
| L | 89.8 | 1.6 | 8.5 | 0.03 | 98.2 | 280 |

PVA Polymers M through W

Table 2 gives the content of the vinyl alcohol units, vinyl ester units, and other monomer units, the degree of saponification, and the polymerization degree of the PVA polymers M through W.

The content of the vinyl alcohol units, vinyl ester units, and other monomer units of the PVA polymers was quantified by 500 MHz $^1$H-NMR. At the time of the determination by $^1$H-NMR, DMSO deuteride or a mixture of methanol-d4 and $D_2O$ (methanol d4/$D_2O$=2/8) was used as a solvent for a PVA polymer and a vinyl ester polymer which is a precursor thereof.

The polymerization degree of the PVA polymers was determined in the following manner.

TABLE 2

| Type of PVA polymer | Vinyl alcohol Units (mole %) | Vinyl ester units (mole %) | Other monomer units (mole %) | | Degree of Saponification | Polymerization degree |
|---|---|---|---|---|---|---|
| M | 88.0 | 12.0 | None | | 88.0 | 550 |
| N | 98.5 | 1.5 | None | | 98.5 | 550 |
| O | 75.5 | 24.5 | None | | 75.5 | 550 |
| P | 88.0 | 12.0 | None | | 88.0 | 1750 |
| Q | 98.5 | 1.5 | None | | 98.5 | 1750 |
| R | 92.3 | 0.7 | Veova-10[a] | 4.0 | 99.2 | 460 |
|   |      |     | Itaconic acid | 3.0 |      |     |
| S | 60.3 | 29.5 | Allyl acetate | 10.2 | 67.1 | 256 |
| T | 66.7 | 29.8 | Allyl acetate | 3.5 | 66.0 | 310 |
| U | 69.6 | 13.9 | 5-hexene-1,2-diol | 16.5 | 83.4 | 265 |
| V | 58.6 | 25.0 | 5-hexene-1-ol | 15.4 | 70.1 | 285 |
|   |      |      | Itaconic acid | 1.0 |      |     |
| W | 67.0 | 23.5 | Ethylene | 9.2 | 74.0 | 295 |
|   |      |      | AMPS[b] | 0.3 |      |     |

[a] Velva-10: total $C_{10}$ branched fatty acid vinyl ester (SHELL KAGAKU)
[b] AMPS: 2-acrylamidopropylsulfonic acid PVA Polymers X through AF Table 3 gives the content of the vinyl alcohol units, vinyl ester units, ethylene units, and carboxylic acid and lactone units, the degree of saponification, and the polymerization degree of the PVA polymers X through AF.

TABLE 3

| Type of PVA polymer | Vinyl alcohol units (mole %) | Vinyl ester units (mole %) | Ethylene units (mole %) | Carboxylic acid and lactone units (mole %) | Degree of Saponification | Polymerization degree |
|---|---|---|---|---|---|---|
| X | 94.7 | 0.7 | 2.5 | 2.05 | 99.2 | 2400 |
| Y | 94.1 | 2.8 | 3.0 | 0.01 | 97.0 | 150 |
| Z | 73.2 | 23.7 | 1.5 | 1.54 | 75.5 | 500 |
| AA | 97.2 | 1.5 | 1.2 | 0.05 | 98.5 | 1500 |
| AB | 72.3 | 23.9 | 3.5 | 0.3 | 75.2 | 500 |
| AC | 90.9 | 1.4 | 4.5 | 0.2 | 98.5 | 150 |
| AD | 95.5 | 1.4 | 3.5 | 0.03 | 98.5 | 2400 |
| AE | 96.5 | 0.4 | 3.5 | 0.01 | 99.5 | 1500 |
| AF | 92.9 | 0.5 | 4.5 | 2.05 | 99.5 | 1500 |

(1) Viscosity Average Degree of Polymerization

The polymerization degree (viscosity average degree of polymerization) of the PVA polymers was determined in accordance with JIS-K6726. That is, the PVA polymers were resaponified and purified, and the viscosity average degree of polymerization (P) was then determined by the following equation on the basis of the intrinsic viscosity [η], as determined in 30° C. water.

$$P=([\eta] \times 10^3/8.29)^{(1/0.62)}$$

Example 1

Figure 2:
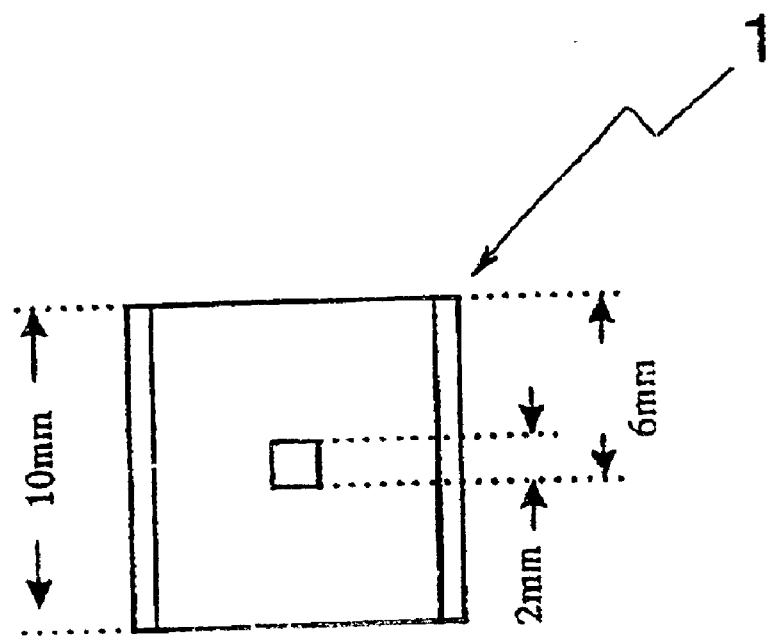
FIG. 2 is a top view of the green molding illustrated in FIG. 1.

100 parts of magnetite ($Fe_3O_4$), 60 parts of water, and 0.3 part of ammonium polyacrylate salt deflocculant were introduced into a ball mill and milled for 90 hours. To the milled mixture thus obtained, an aqueous solution of PVA polymer was added in an amount of 1.8 parts in terms of solids, and the whole mixture was mixed to obtain a homogenous slurry (slurry concentration of 55%). The slurry was granulated by spray drying, giving granules (particle diameter of 100±20 μm). The granules were compression-molded (1.2 t/cm$^2$) in a mold, giving a rectangular green molding 20 mm wide, 100 mm long, and 10 mm thick. Granules the same as above were also compression-molded (2.0 t/cm$^2$ and 1.5 t/cm$^2$) in molds of specific shapes, giving green moldings of the complex shape illustrated in FIG. 1 (side view) and FIG. 2 (top view). Table 4A gives the results of evaluation.

Examples 2 Through 12

Rectangular green moldings and green moldings of complex shape were obtained in the same manner as in Example 1 except for the use of polymers B through L instead of the binder used in Example 1. Table 4A gives the results of evaluation.

Comparative Examples 1 Through 20

Rectangular green moldings and green moldings of in) complex shape were obtained in the same manner as in Example 1 except for the use of polymers M through AF instead of the binder used in Example 1. Table 4B gives the results of evaluation.

The rectangular and complex green moldings obtained above were evaluated in the following manner.

(1) Molding Strength (Toughness)

The rectangular green moldings were checked in a three-point bending test by the same method noted in Japanese Examined Patent Application (Kokoku) 6-6504, and the energy (toughness) needed for the moldings to break was determined based on the area of an S*S curve.

(2) Formability

Compressing properties were determined on the basis of the number of moldings which were not fully formed or which had partial defects when the granules were compression-molded to form 100 green moldings of complex shape.

A: none
B: no more than 2
C: 3 to 5
D: 6 or more

Mold staining was determined on the basis of the state of mold staining when the granules were compression-molded to form 100 green moldings of complex shape.

A: no staining
B: virtually no staining, but stained areas relatively easily wiped clean
C: obvious staining, but still relatively easily wiped clean
D: severe staining which could hardly be wiped clean (3) Handling Properties of Moldings These properties were determined based on the extent of the brittleness of 50 green moldings of complex shape obtained under normal conditions when these green moldings were picked up with tweezers. The green moldings were. picked up with tweezers at the 1 mm thick parts of the upper side surface illustrated in the side view in FIG. 1.

A: not broken when picked up with tweezers
B: 1 broken when picked up with tweezers
C: 2 to 5 broken when picked up with tweezers
D: 6 or more broken when picked up with tweezers (4) Ceramic Moldings 30 green moldings (molded at a pressure of 2.0 t/cm$^2$) which were not broken when picked up with tweezers in the test to evaluate the handling properties of the green moldings of complex shape in (3) above were sintered. As sintering conditions, the moldings were heated from room temperature in air to 300° C. over 6 hours using an electric furnace, the organic materials such as the binder were thermally decomposed, the moldings were then heated to 1200° C. at a rate of 50° C./min, and they were heated for 4 hours at that temperature. The moldings were then cooled to room temperature, and the state of the sintered ceramic moldings was examined.

A: no cracks
B: 1 ceramic molding with cracks
C: 2 or 3 ceramic moldings with cracks
D: 4 or more ceramic moldings with cracks

TABLE 4A

| Example | Type of PVA polymer | Molding strength (toughness) | Molding pressure (2.0 t/cm$^2$) | | | Molding pressure (1.5 t/cm$^2$) | | | Ceramic molding |
|---|---|---|---|---|---|---|---|---|---|
| | | | Formability | | | Formability | | | |
| | | | Compressing properties | Mold stains | Handling properties | Compressing Properties | Mold stains | Handling properties | |
| Ex. 1 | A | 9.5 | A | A | A | A | A | A | A |
| Ex. 2 | B | 9.7 | A | A | A | A | A | A | A |
| Ex. 3 | C | 8.5 | A | A | A | A | A | A | A |
| Ex. 4 | D | 8.6 | A | A | A | A | A | A | A |
| Ex. 5 | E | 8.0 | A | A | A | A | A | A | A |
| Ex. 6 | F | 8.3 | B | B | B | B | B | B | B |
| Ex. 7 | G | 8.4 | B | B | B | B | B | B | B |
| Ex. 8 | H | 10.2 | A | A | A | B | A | A | A |

TABLE 4A-continued

| | | Molding strength (toughness) | Molding pressure (2.0 t/cm$^2$) | | | Molding pressure (1.5 t/cm$^2$) | | | |
| | Type of | | Formability | | | Formability | | | |
| Example | PVA polymer | | Compressing properties | Mold stains | Handling properties | Compressing Properties | Mold stains | Handling properties | Ceramic molding |
| --- | --- | --- | --- | --- | --- | --- | --- | --- | --- |
| Ex. 9 | I | 7.9 | B | B | B | B | B | B | B |
| Ex. 10 | J | 7.6 | B | B | B | B | B | B | B |
| Ex. 11 | K | 7.6 | B | B | B | B | B | B | B |
| Ex. 12 | L | 7.7 | B | B | B | B | B | B | B |

Molding strength (toughness) is relative to the value of Comp. Ex. 1, which is 1.0.

TABLE 4B

| | | Molding strength (toughness) | Molding pressure (2.0 t/cm$^2$) | | | Molding pressure (1.5 t/cm$^2$) | | | |
| | Type of | | Formability | | | Formability | | | |
| Example | PVA polymer | | Compressing properties | Mold stains | Handling properties | Compressing Properties | Mold stains | Handling properties | Ceramic molding |
| --- | --- | --- | --- | --- | --- | --- | --- | --- | --- |
| Comp. Ex. 1 | M | 1.0 | D | D | D | D | C | D | D |
| Comp. Ex. 2 | N | 0.9 | D | C | D | D | B | D | D |
| Comp. Ex. 3 | O | 1.1 | D | D | D | D | C | D | D |
| Comp. Ex. 4 | P | 1.2 | D | D | D | D | C | D | D |
| Comp. Ex. 5 | Q | 1.1 | D | C | D | D | B | D | D |
| Comp. Ex. 6 | R | 7.6 | C | D | C | D | C | D | C |
| Comp. Ex. 7 | S | 5.2 | C | D | C | D | C | D | C |
| Comp. Ex. 8 | T | 2.9 | C | D | C | D | C | D | C |
| Comp. Ex. 9 | U | 6.1 | C | D | C | D | C | D | C |
| Comp. Ex. 10 | V | 5.9 | C | D | C | D | C | D | C |
| Comp. Ex. 11 | W | 3.0 | C | D | C | C | D | C | C |
| Comp. Ex. 12 | X | 6.9 | C | D | C | C | C | C | C |
| Comp. Ex. 13 | Y | 1.3 | D | C | D | D | C | D | D |
| Comp. Ex. 14 | Z | 2.8 | C | D | C | C | C | C | C |
| Comp. Ex. 15 | AA | 3.1 | D | C | D | D | B | D | D |
| Comp. Ex. 16 | AB | 4.1 | C | D | D | C | D | D | C |
| Comp. Ex. 17 | AC | 1.4 | D | C | D | D | C | D | D |
| Comp. Ex. 18 | AD | 6.5 | C | C | C | D | C | D | C |
| Comp. Ex. 19 | AE | 7.2 | C | B | C | C | B | C | B |
| Comp. Ex. 20 | AF | 6.2 | C | D | C | C | C | C | C |

Molding strength (toughness) is relative to the value of Comp. Ex. 1, which is 1.0.

The results in Tables 4A and 4B show that the use of the ceramic-molding binder of the present invention resulted in strength equal to or greater than that obtained with the use of conventional binders when forming green moldings having a relatively simple shape. Particularly during the formation of small green moldings of complex shape, not only was the green formability (compressing properties and mold staining) better, but the resulting green moldings also had better handling properties. There were also far fewer cracks in ceramic sinters obtained upon the sintering of the green moldings, resulting in better yields.

Although the use of conventional vinyl alcohol polymers as binders did improve the strength of green moldings of relatively simple shape (comparative Examples 6 through 11), efforts to obtain small green moldings of more complex shape did not result in altogether favorable granule pressure propagation unless a certain level of molding pressure was applied. The tips of the fine areas of the moldings in particular were found to suffer from poor compressing properties. Although higher molding pressure resulted in some improvement in compressing properties, there was also more obvious staining of the molds. It was thus impossible to simultaneously achieve satisfactory compressing properties while avoiding mold stains. The handling properties of the green moldings were also not altogether satisfactory. More cracks were also found in the sintered ceramic moldings, making it impossible to achieve satisfactory effects (Comparative Examples 1 through 11). Even the use of PVA polymers having ethylene units did not afford satisfactory results (Comparative Examples 12 through 20) if the ethylene units, the carboxylic acid and lactone units, the degree of saponification, and the polymerization degree were outside the ranges stipulated in the present invention.

In contrast, the use of the ceramic-molding binder of the present invention simultaneously afforded satisfactory compressing properties while avoiding mold stains, gave green moldings with satisfactory handling properties, and resulted in higher yields of sintered ceramic moldings. These properties were clearly better than those obtained with the use of conventional binders.

Compared to conventional binders, the ceramic-molding binder of the present invention affords better formability and green moldings with better handling properties, particularly during the formation of smaller products of complex shape in various molding methods, especially compression-molding. Ceramic moldings obtained by sintering green moldings using the ceramic-molding binder of the present invention have far fewer cracks and better yields. The present invention thus provides the greater performance demanded of ceramic products, such as better quality.

The entire disclosures of the specifications, claims and figures of Japanese Patent Applications No. 11-320936 and 2000-169122 filed on Nov. 11, 1999 and Jun. 6, 2000, respectively, are hereby incorporated by reference.

What is claimed is:

1. A ceramic-molding binder, comprising a vinyl alcohol polymer having an ethylene unit content of 2 to 19 mole %, a polymerization degree of 200 to 2,000, a degree of saponification of 80 to 99.99 mole %, a total content of carboxyl group and lactone rings of 0.02 to 0.4 mole %, wherein the carboxylic acid and lactone ring content in the vinyl alcohol polymer satisfies the following Formula I:

$$-1.94 \times 10^{-5} \times P + 0.044 \leq \text{content} \leq -1.39 \times 10^{-4} \times P + 0.42 \quad \text{(I)}$$

(where the content (in mole %) represents the content of carboxylic acid and lactone rings, and P represents the viscosity average degree of polymerization of the vinyl alcohol polymer).

2. A ceramic-molding composition, comprising 0.1 to 20 weight parts of the ceramic-molding binder according to claim 1, per 100 weight parts of ceramic powder.

3. A ceramic-molding composition according to claim 2, wherein the ceramic powder comprises a ferrite powder.

4. A method for producing a ceramic molding, comprising drying an aqueous kneaded material obtained from the ceramic-molding composition according to claim 2 to form granules, and molding the granules followed by sintering.

5. A compression-molding binder for ceramics, comprising a vinyl alcohol polymer having an ethylene unit content of 2 to 19 mole %, a polymerization degree of 200 to 2,000, a degree of saponification of 80 to 99.99 mole %, a total content of carboxyl group and lactone rings of 0.02 to 0.4 mole %, wherein the carboxylic acid and lactone ring content in the vinyl alcohol polymer satisfies the following Formula I:

$$-1.94 \times 10^{-5} \times P + 0.044 \leq \text{content} \leq -1.39 \times 10^{-4} P + 0.42 \quad \text{(I)}$$

(where the content (in mole %) represents the content of carboxylic acid and lactone rings, and P resents the viscosity average degree of polymerization of the vinyl alcohol polymer).

6. A ceramic-compression-molding composition, comprising 0.1 to 20 weight parts of the ceramic-molding binder according to claim 5, per 100 weight parts of ceramic powder.

7. A ceramic-molding composition according to Claim 6, wherein the ceramic powder comprises a ferrite powder.

8. A method for producing a ceramic molding, comprising drying an aqueous kneaded material obtained from the ceramic-molding composition according to claim 6 to form granules, and molding the granules followed by sintering.

9. A method for producing a ceramic molding, comprising drying an aqueous kneaded material obtained from the ceramic-molding composition according to claim 3 to form granules, and molding the granules followed by sintering.

10. A method for producing a ceramic molding, comprising drying an aqueous kneaded material obtained from the ceramic-molding composition according to claim 7 to form granules, and molding the granules followed by sintering.

* * * * *